US011984244B2

(12) United States Patent
Zeng et al.

(10) Patent No.: US 11,984,244 B2
(45) Date of Patent: May 14, 2024

(54) SINTERED NEODYMIUM-IRON-BORON MAGNET AND PREPARATION METHOD THEREOF

(71) Applicants: Baotou Jinmeng Magnetic Materials Co., Ltd., Baotou (CN); Yujun Zeng, Baotou (CN)

(72) Inventors: Yujun Zeng, Baotou (CN); Minglei Han, Baotou (CN); Zhaoyong Liu, Baotou (CN); Xueliang Zhang, Baotou (CN); Zhigang Xue, Baotou (CN); Quanjin Zeng, Baotou (CN); Yuxiang Dong, Baotou (CN); Junxing Zhao, Baotou (CN); Lan Feng, Baotou (CN); Ze Liu, Baotou (CN); Xia Zhang, Baotou (CN); Jialiang Zhang, Baotou (CN); Xiangjun Chen, Baotou (CN)

(73) Assignees: Baotou Jinmeng Magnetic Materials Co., Ltd., Baotou (CN); Yujun Zeng, Baotou (CN)

( * ) Notice: Subject to any disclaimer, the term of this patent is extended or adjusted under 35 U.S.C. 154(b) by 0 days.

(21) Appl. No.: 17/531,749

(22) Filed: Nov. 20, 2021

(65) Prior Publication Data

US 2022/0246337 A1 Aug. 4, 2022

(30) Foreign Application Priority Data

Feb. 2, 2021 (CN) ......................... 202110142574.2

(51) Int. Cl.
*H01F 1/057* (2006.01)
*H01F 41/02* (2006.01)

(52) U.S. Cl.
CPC ........... *H01F 1/0577* (2013.01); *H01F 41/02* (2013.01)

(58) Field of Classification Search
None
See application file for complete search history.

(56) References Cited

U.S. PATENT DOCUMENTS

2012/0091844 A1* 4/2012 Nakajima ........... H01F 41/0266 310/152
2013/0092868 A1* 4/2013 Nakajima ................. H01F 1/01 252/62.51 R
2014/0369881 A1* 12/2014 Zakotnik ................. C22C 38/10 75/352

FOREIGN PATENT DOCUMENTS

CN 107256748 A * 10/2017

OTHER PUBLICATIONS

Machine translation of CN 107256748A. (Year: 2017).*

* cited by examiner

*Primary Examiner* — Xiaowei Su
(74) *Attorney, Agent, or Firm* — JWIP & Patent Services, LLC; Jacob G. Weintraub, Esq.

(57) ABSTRACT

The present disclosure discloses a sintered neodymium-iron-boron magnet and a preparation method thereof. The sintered neodymium-iron-boron magnet includes the following raw materials in mass percentage: 1%-40% of an iron powder or a steel powder with a magnetic induction intensity of more than 1.2 T, not more than 10% of a praseodymium-neodymium metal hydride powder, and a remainder of a neodymium-iron-boron fine powder, wherein the mass percentages of the above raw materials add up to 100%. The preparation method includes: weighing the raw materials in mass percentage; mixing the weighed raw materials uniformly, and then subjecting to magnetic-field press molding, isostatic pressing, sintering and tempering to obtain the sintered neodymium-iron-boron magnet.

10 Claims, 4 Drawing Sheets

NIM-2000H HYSTERESIGRAPH TEST REPORT

NIM-2000H HYSTERESIGRAPH TEST REPORT

Measurement Results

| | | |
|---|---|---|
| Br | = 1.281 | T |
| | 12.81 | kGs |
| Hcb | = 973.1 | kA/m |
| | 12.23 | kOe |
| Hcj | = 1397 | kA/m |
| | 17.55 | kOe |
| (BH)max | = 309.4 | kJ/m^3 |
| | 38.89 | MGOe |
| HK | =1374 | kA/m |
| | 17.27 | kOe |
| Hk/Hc j | = 98.4 | % |
| Bd | = 0.634 | T |
| | 6.337 | kGs |
| Hd | = 488.3 | kA/m |
| | 6.136 | kOe |

Test Condition

Test No. 201010 -2

Spe. Grade : 2

Temperature : 20°C

Material : NdFeB

Shape: Cylinder

Size : 7.58mm

Date : 2020-10-10

Test by : 20

Check by: 20

SINTERED NEODYMIUM-IRON-BORON MAGNET AND PREPARATION METHOD THEREOF

CROSS REFERENCE TO RELATED APPLICATION

This patent application claims the benefit and priority of Chinese Patent Application No. 202110142574.2, entitled "SINTERED NEODYMIUM-IRON-BORON MAGNET AND PREPARATION METHOD THEREOF" filed with the China National Intellectual Property Administration on Feb. 2, 2021, the disclosure of which is incorporated by reference herein in its entirety as part of the present application.

TECHNICAL FIELD

The present disclosure belongs to the technical field of magnetic materials, and particularly to a sintered neodymium-iron-boron magnet and a preparation method thereof.

BACKGROUND ART

The existing preparation process of a sintered neodymium-iron-boron consists of smelting, hydrogen decrepitating, jet milling, press molding, isostatic pressing and sintering, and a specific process is performed as follows: smelting rare earth metals, ferroboron, pure iron and other metal elements to prepare a neodymium-iron-boron alloy; placing the neodymium-iron-boron alloy in a hydrogen decrepitation furnace for preliminary decrepitation to prepare a coarse powder; smashing the coarse powder into a fine powder of about 1-10 microns by jet milling; placing the fine powder in a magnetic field-press for orientation molding, and then pressing again by isostatic pressing at a pressure of 150-250 MPa; finally, sintering the resultant in a sintering furnace at a high temperature of 1000-1100° C., then tempering at 880-950° C. for 3 h and tempering at 440-640° C. for 4 h to obtain a neodymium-iron-boron magnet. The neodymium-iron-boron magnet is composed of a main phase and a neodymium-rich phase, wherein the main phase is $Nd_2Fe_{14}B$, and a mass ratio of Nd in the main phase is 26.68%. Since the neodymium-rich phase contains a large amount of Nd, and the rare earth is partly lost during smelting, the amount of rare earth added in a smelting formulation is not allowed to be lower than 26.68 wt %, which is the percentage of Re in the neodymium-iron-boron. The rare earth elements are very high in price, and as a result, the neodymium-iron-boron magnet is expensive in cost.

SUMMARY

The first object of the present disclosure is to provide a sintered neodymium-iron-boron magnet with good magnetic properties, small amount of rare earth materials and low cost of raw materials.

The second object of the present disclosure is to provide a method for preparing a sintered neodymium-iron-boron magnet with good magnetic properties, small amount of rare earth materials and low cost of raw materials.

The first object of the present disclosure is implemented by the following technical solutions: a sintered neodymium-iron-boron magnet, which comprises the following raw materials in mass percentage: 1%-40% of an iron powder or a steel powder with a magnetic induction intensity of more than 1.2 T, not more than 10% of a praseodymium-neodymium metal hydride powder, and a remainder of a neodymium-iron-boron fine powder, wherein the mass percentages of the above raw materials add up to 100%.

In some embodiments, the iron powder is any one of an industrial pure iron powder, a hydroxy iron powder or a carbon-based iron powder or a combination thereof; the steel powder is a low carbon steel powder or a silicon steel powder or a combination of both; a particle size of the iron powder or the steel powder is in a range of 1-10 microns.

In some embodiments, the praseodymium-neodymium metal hydride powder is prepared as follows:

(1) adding a praseodymium-neodymium metal in a rotary hydrogen decrepitation furnace, and after pumping to a vacuum degree of less than 2 Pa, passing hydrogen gas with a purity of more than 99.99% for decrepitation and hydrogenation to form a praseodymium-neodymium hydride;

(2) milling the praseodymium-neodymium hydride into 1-10 microns by jet milling to obtain the praseodymium-neodymium metal hydride powder.

In some embodiments, the neodymium-iron-boron fine powder is prepared as follows:

(1) weighing the following raw materials in parts by mass: 29-33 parts of a rare earth metal RE, 1-3 parts of an additive metal M, 0.9-1 part of B and 63-69.1 parts of Fe;

(2) melting the weighed raw materials in a smelting furnace at 1400-1600° C., then refining for 5 min, and casting and cooling to form a neodymium-iron-boron alloy with a thickness of 1-5 mm;

(3) adding the neodymium-iron-boron alloy in a rotary hydrogen decrepitation furnace, and after pumping to a vacuum degree of less than 2 Pa, passing hydrogen gas with a purity of more than 99.99% for decrepitation to obtain a coarse powder; subsequently, milling the coarse powder into 1-10 microns by jet milling to obtain the neodymium-iron-boron fine powder.

In some embodiments, the additive metal M is any one of Co, Cu, Al, Ga, Nb or Zr or a combination thereof.

The second object of the present disclosure is implemented by following technical solutions: a method for preparing a sintered neodymium-iron-boron magnet, which comprises:

step 1: weighing the following raw materials in mass percentage: 1%-40% of an iron powder or a steel powder with a magnetic induction intensity of more than 1.2 T, not more than 10% of a praseodymium-neodymium metal hydride powder, and a remainder of a neodymium-iron-boron fine powder, wherein the mass percentages of the above raw materials add up to 100%;

step 2: mixing the weighed raw materials uniformly, and subjecting to magnetic field-press molding, isostatic pressing, sintering and tempering to obtain the sintered neodymium-iron-boron magnet.

In some embodiments, the iron powder is any one of an industrial pure iron powder, a hydroxy iron powder or a carbon-based iron powder or a combination thereof; the steel powder is a low carbon steel powder or a silicon steel powder or a combination of both; a particle size of the iron powder or the steel powder is in a range of 1-10 microns.

In some embodiments, the praseodymium-neodymium metal hydride powder is prepared as follows:

(1) adding a praseodymium-neodymium metal in a rotary hydrogen decrepitation furnace, and after pumping to a vacuum degree of less than 2 Pa, passing hydrogen gas with a purity of more than 99.99% for decrepitation and hydrogenation to form a praseodymium-neodymium hydride;

(2) milling the praseodymium-neodymium hydride into 1-10 microns by jet milling to obtain the praseodymium-neodymium metal hydride powder.

In some embodiments, the neodymium-iron-boron fine powder is prepared as follows:

(1) weighing the following raw materials in parts by mass: 29-33 parts of rare earth metal RE, 1-3 parts of an additive metal M, 0.9-1 part of B and 63-69.1 parts of Fe;

(2) melting the weighed raw materials in a smelting furnace at 1400-1600° C., then refining for 5 min, and casting and cooling to form a neodymium-iron-boron alloy with a thickness of 1-5 mm;

(3) adding the neodymium-iron-boron alloy in a rotary hydrogen decrepitation furnace, and after pumping to a vacuum degree of less than 2 Pa, passing hydrogen gas with a purity of more than 99.99% for decrepitation to obtain a coarse powder; subsequently, milling the coarse powder into 1-10 microns by jet milling to obtain the neodymium-iron-boron fine powder.

In some embodiments, the additive metal M is any one of Co, Cu, Al, Ga, Nb or Zr or a combination thereof.

In the present disclosure, the neodymium-iron-boron fine powder, the iron powder and the praseodymium-neodymium metal hydride powder are mixed uniformly and then sintered to form a densified hard magnet. The neodymium-iron-boron crystal grains act as the source of the magnetic properties of the hard magnet. The iron powder particles belong to soft magnets and play the role of magnetic properties transition, so it basically does not affect the reduction of remanence. Due to the addition of a large amount of iron powder, the neodymium-rich phase will inevitably be in shortage during sintering, which further leads to the decrease in coercivity. The praseodymium-neodymium metal hydride powder is added, not only for supplementing the neodymium-rich phase, but also for consuming the oxygen in the iron powder and reducing the influence on coercivity. In this way, the prepared neodymium-iron-boron magnet may be ensured to have magnetic properties comparable to that of a sintered neodymium-iron-boron magnet prepared in the prior art, and meanwhile the added amount of the rare earth elements is greatly decreased, thereby significantly reducing the cost of raw materials for the sintered neodymium-iron-boron magnet.

The advantages of the present disclosure are as follows: the sintered neodymium-iron-boron magnet prepared by using the formulation and the preparation method of the present disclosure may have magnetic properties comparable to that of a sintered neodymium-iron-boron magnet prepared in the prior art; at the same time, the added amount of the rare earth elements is greatly decreased, thereby significantly reducing the cost of raw materials for sintered neodymium-iron-boron magnets. In addition, plenty of the scarce rare earth resource is also saved.

DETAILED DESCRIPTION OF THE EMBODIMENTS

Figure 1:
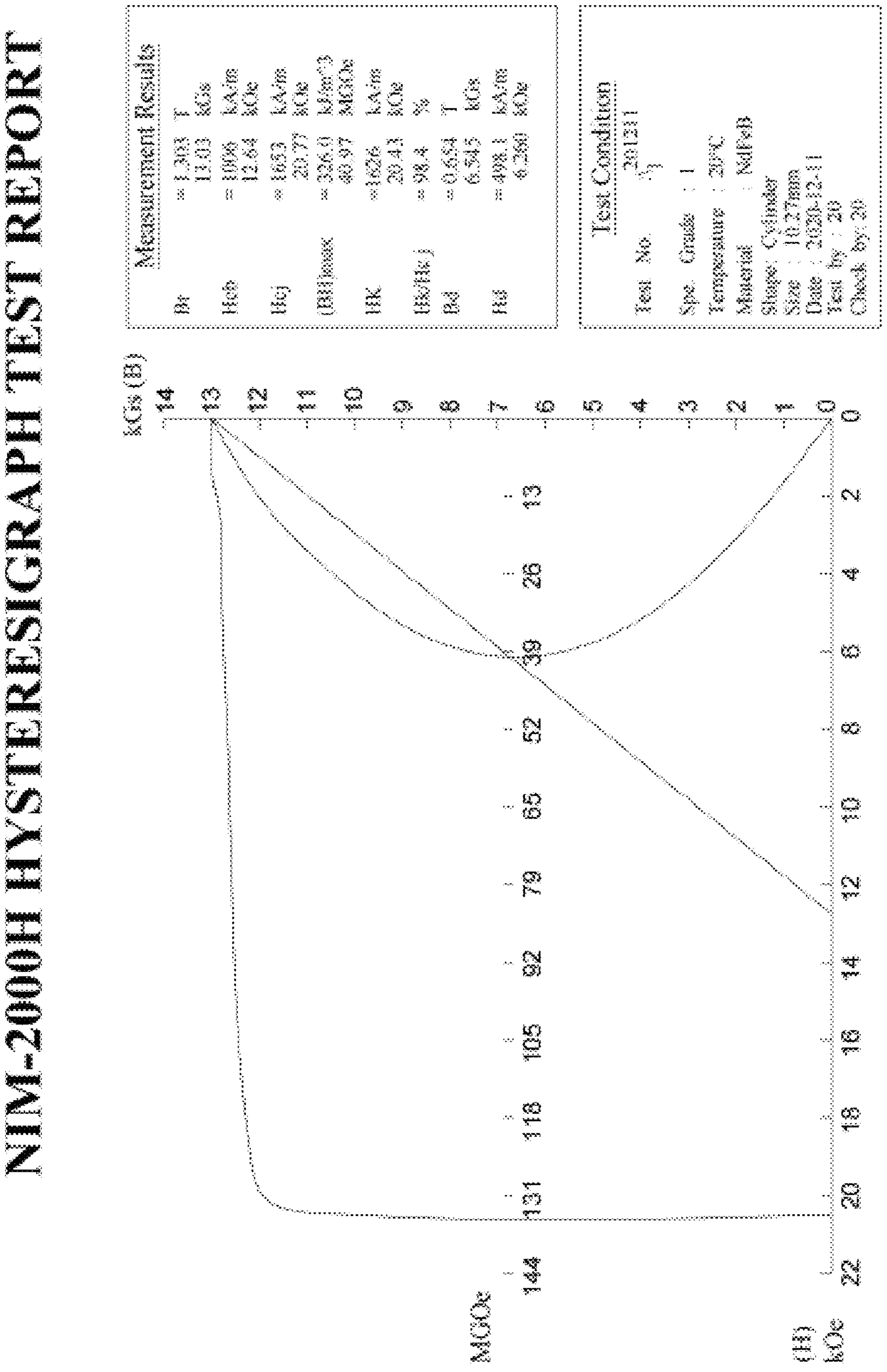
FIG. 1 is a test diagram of the magnetic properties of the sintered neodymium-iron-boron magnet prepared by the preparation method described in the background art.

Example 1 A sintered neodymium-iron-boron magnet was provided, which included the following raw materials in mass percentage: 18.5% of an industrial pure iron powder with a magnetic induction intensity of more than 1.2 T and a particle size in a range of 1-10 microns, 1.5% of a praseodymium-neodymium metal hydride powder, and 80% of a neodymium-iron-boron fine powder, wherein the mass percentages of above raw materials added up to 100%, and a lubricant was added in an amount of 1‰ of the total mass of the raw materials.

Among them, the praseodymium-neodymium metal hydride powder was prepared as follows:

(1) a praseodymium-neodymium metal was added in a rotary hydrogen decrepitation furnace, and after pumping to a vacuum degree of less than 2 Pa, hydrogen gas with a purity of more than 99.99% was introduced for decrepitation and hydrogenation to form a praseodymium-neodymium hydride;

(2) the praseodymium-neodymium hydride was milled into 1-10 microns by jet milling to obtain the praseodymium-neodymium metal hydride powder.

The neodymium-iron-boron fine powder was prepared as follows:

(1) the following raw materials were weighed in parts by mass: 31 parts of a rare earth metal RE, 2 parts of an additive metal M, 0.9 parts of B and 66.1 parts of Fe; in this example, the rare earth metal RE included 29 parts of a praseodymium-neodymium alloy and 2.0 parts of Dy in parts by mass, and the additive metal M included 1 part of Co, 0.15 parts of Cu, 0.4 parts of Al, 0.2 parts of Ga, 0.1 parts of Zr and 0.15 parts of Nb in parts by mass;

(2) the weighed raw materials were melted in a smelting furnace at 1400-1600° C., then refined for 5 min, and casted and cooled to form a neodymium-iron-boron alloy with a thickness of 1-5 mm;

(3) the neodymium-iron-boron alloy was added in a rotary hydrogen decrepitation furnace, and after pumping to a vacuum degree of less than 2 Pa, hydrogen gas with a purity of more than 99.99% was introduced for decrepitation to obtain a coarse powder; then the coarse powder was milled into 1-10 microns by jet milling to obtain the neodymium-iron-boron fine powder.

Example 2 The preparation method of the sintered neodymium-iron-boron magnet in Example 1 was provided, which included the following steps:

step 1: the following raw materials were weighed in mass percentage: 18.5% of an industrial pure iron powder with a magnetic induction intensity of more than 1.2 T and a particle size in a range of 1-10 microns, 1.5% of a praseodymium-neodymium metal hydride powder, and 80% of a neodymium-iron-boron fine powder, wherein the mass percentages of above raw materials added up to 100%, and a lubricant was added in an amount of 1‰ of the total mass of the raw materials;

step 2: the weighed raw materials were mixed uniformly and subjected to magnetic field-press molding, isostatic pressing, sintering and tempering to obtain the sintered neodymium-iron-boron magnet, wherein the specific preparation process was as follows: the weighed raw materials were mixed uniformly; the mixed raw materials were placed in a molding press with a magnetic field of more than 1.2 T for orientation molding (so that the magnetic field direction of the powder particles was consistent with that of the press), and then compressed at a pressure of 0.1-1 MPa to a density of 3.6-4.5 g/cm$^3$, followed by compressed at a pressure of 150-250 MPa with an isostatic press to a density of 4.3-4.7 g/cm$^3$; subsequently, the resultant was placed in a vacuum sintering furnace at 1000-1100° C. for 4 h, and was tempered at 880-950° C. for 3 h and then tempered at 440-640° C. for 4 h to obtain the sintered neodymium-iron-boron magnet.

Compared with the prior art (i.e. the preparation method described in the background art), the usage amount of rare earth elements in this example is reduced by 13.66%.

Example 3 A sintered neodymium-iron-boro magnet was provided, which included the following raw materials in mass percentage: 40% of a carbon-based iron powder with a magnetic induction intensity of more than 1.2 T and a particle size in a range 1-10 microns, 4% of a praseodymium-neodymium metal hydride powder, and 56% of a neodymium-iron-boron fine powder, wherein the mass percentages of raw materials added up to 100%, and a lubricant was added in an amount of 1‰ of the total mass of the raw material.

The praseodymium-neodymium metal hydride powder was prepared as follows:

(1) a praseodymium-neodymium metal was added in a rotary hydrogen decrepitation furnace, and after pumping to a vacuum degree of less than 2 Pa, hydrogen gas with a purity of more than 99.99% was introduced for decrepitation and hydrogenation to form a praseodymium-neodymium hydride;

(2) the praseodymium-neodymium hydride was milled into 1-10 microns by jet milling to obtain the powder of praseodymium-neodymium metal hydride powder.

The neodymium-iron-boron fine powder was prepared as follows:

(1) the following raw materials were weighed in parts by mass: 32 parts of a rare earth metal RE, 2 parts of an additive metal M, 1 part of B and 65 parts of Fe; in this example, the rare earth metal RE included 30 parts of a praseodymium-neodymium alloy and 2.0 parts of Tb in parts by mass, and the additive metal M included 1 part of Co, 0.15 parts of Cu, 0.4 parts of Al, 0.2 parts of Ga, 0.1 parts of Zr, and 0.15 parts of Nb in parts by mass.

(2) the weighed raw materials were melted in a smelting furnace at 1400-1600° C., then refined for 5 min, and casted and cooled to form a neodymium-iron-boron alloy with a thickness of 1-5 mm;

(3) the neodymium-iron-boron alloy was added into a rotary hydrogen decrepitation furnace, and after pumping to a vacuum degree of less than 2 Pa, hydrogen gas with a purity of more than 99.99% was introduced for decrepitation to obtain a coarse powder; then the coarse powder was milled into 1-10 microns by jet milling to obtain the neodymium-iron-boron fine powder.

Example 4 The preparation method of the sintered neodymium-iron-boron magnet in Example 3 was provided, which included the following steps:

Step 1, the raw materials were weighed according to the following mass percentage: 40% of carbon-based iron powder with a magnetic induction intensity of more than 1.2 T and a particle size of 1-10 microns, 4% of hydride powder of praseodymium-neodymium, 56% of a neodymium-iron-boron fine powder, wherein the mass percentages of above raw materials added up to 100%, and a lubricant was added in an amount of 1‰ of the total mass of the raw materials.

step 2, the weighed raw materials were mixed uniformly and subjected to magnetic field-press molding, isostatic pressing, sintering, and tempering to obtain the sintered neodymium-iron-boron magnet, wherein the specific preparation process was as follows: the weighed raw materials were mixed uniformly, the mixed raw materials were placed in a molding press with a magnetic field of more than 1.2 T for orientation molding (so that the magnetic field direction of the powder particles was consistent with that press), and then compressed at a pressure of 0.1-1 MPa to a density of 3.6-4.5 g/cm$^3$, followed by compressed at a pressure of 150-250 MPa with an isostatic press to a density of 4.3-4.7 g/cm$^3$; subsequently, the resultant was placed in a vacuum sintering furnace at 1000-1100° C. for 4 h, and was tempered at 880-950° C. for 3 h, and then tempered at 440-640° C. for 4 h to obtain the sintered neodymium-iron-boron magnet.

Compared with the prior art (i.e. the preparation method described in the background art), the usage amount of rare earth elements in this example is reduced by 31.5%.

Example 5 A sintered neodymium-iron-boron magnet was provided, which included the following raw materials in mass percentage: 8% of a low carbon steel powder with a magnetic induction intensity of more than 1.2 T and a particle size in a range of 1-10 microns, 1% of a praseodymium-neodymium metal hydride powder, and 91% of a neodymium-iron-boron fine powder, wherein the mass percentages of above raw materials added up to 100%, and a lubricant was added in an amount of 1‰ of the total mass of the raw material.

The praseodymium-neodymium metal hydride powder was prepared as follows:

(1) a praseodymium-neodymium metal was added in a rotary hydrogen decrepitation furnace, and after pumping to a vacuum degree of less than 2 Pa, hydrogen gas with a purity of more than 99.99% was introduced for decrepitation and hydrogenation to form a praseodymium-neodymium hydride;

(2) the praseodymium-neodymium hydride was milled into 1-10 microns by a jet milling to obtain the praseodymium-neodymium metal hydride powder.

The neodymium-iron-boron fine powder was prepared as follows:

(1) the following raw materials were weighed in parts by mass: 30 parts of a rare earth metal RE, 1 part of an additive metal M, 0.9 parts of B and 68.1 parts of Fe; in this example, the rare earth metal RE included 27 parts of a praseodymium-neodymium alloy and 3.0 parts of Tb in parts by mass, and the additive metal M included 0.2 parts of Co, 0.15 parts of Cu, 0.45 parts of Al, 0.1 parts of Ga, and 0.1 parts of Zr in parts by mass;

(2) the weighed raw materials were melted in a smelting furnace at 1400-1600° C., then refined for 5 min, and casted and cooled to form a neodymium-iron-boron alloy with a thickness of 1-5 mm;

(3) the neodymium-iron-boron alloy was added into a rotary hydrogen decrepitation furnace, and after pumping to a vacuum degree of less than 2 Pa, hydrogen gas with a purity of more than 99.99% was introduced for decrepitation to obtain a coarse powder; then the coarse powder was milled into 1-10 microns by jet milling to obtain the neodymium-iron-boron fine powder.

Example 6 The preparation method of the sintered neodymium-iron-boron magnet in Example 5 was provided, which included the following steps:

step 1: the following raw materials were weighed in mass percentage: 8% of a low carbon steel powder with a magnetic induction intensity of more than 1.2 T and a particle size in a range of 1-10 microns, 1% of a praseodymium-neodymium metal hydride powder, and 91% of neodymium-iron-boron fine powder, wherein the mass percentages of above raw materials added up to 100%, and a lubricant was added in an amount of 1‰ of the total mass of the raw materials;

step 2, the weighed raw materials were mixed uniformly and subjected to magnetic field-press molding, isostatic pressing, sintering, and tempering to obtain the sintered neodymium-iron-boron magnet, wherein the specific preparation process was as follows: the weighed raw materials were mixed uniformly; the mixed raw materials were placed in a molding press with a magnetic field of more than 1.2 T for orientation molding (so that the magnetic field direction of the powder particles was consistent with that of the press), and then compressed at a pressure of 0.1-1 MPa to a density of 3.6-4.5 g/cm$^3$, followed by compressed at a pressure of 150-250 MPa with an isostatic press to a density to 4.3-4.7 g/cm$^3$; subsequently, the resultant was placed in a vacuum sintering furnace at 1000-1100° C. for 4 h, and was tempered at 880-950° C. for 3 h, and then tempered at 440-640° C. for 4 h to obtain the sintered neodymium-iron-boron magnet.

Compared with the prior art (i. e. the preparation method described in the background art), the usage amount of rare earth elements in this example is reduced by 5.55%.

Figure 2:
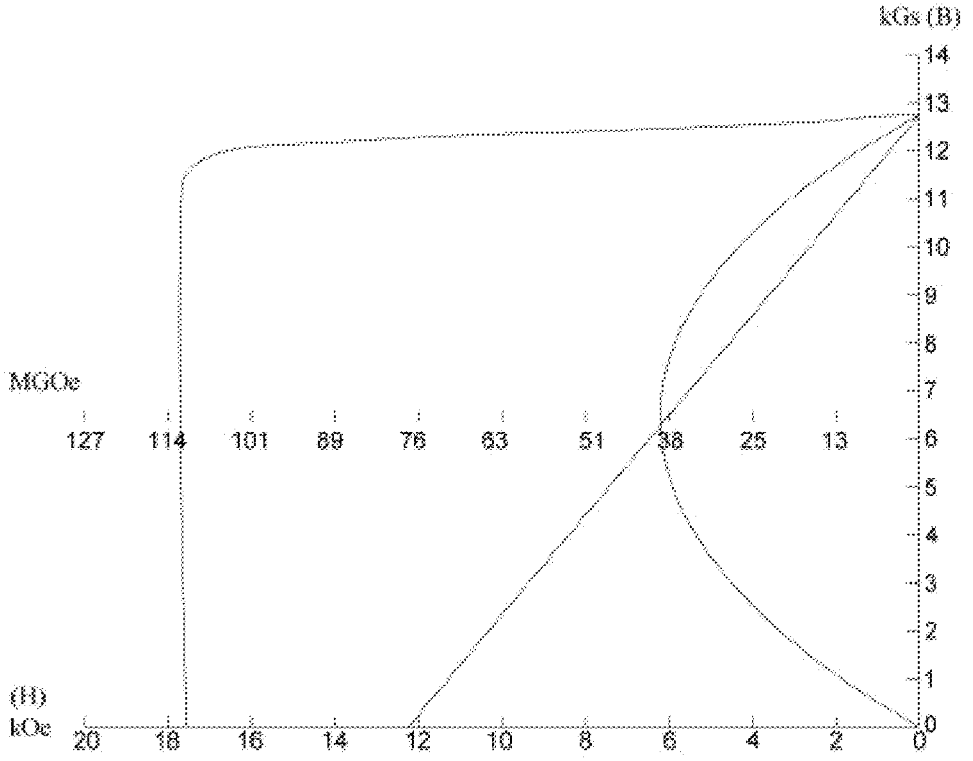
FIG. 2 is a test diagram of the magnetic properties of the sintered neodymium-iron-boron magnet prepared in Example 2.
Figure 3:
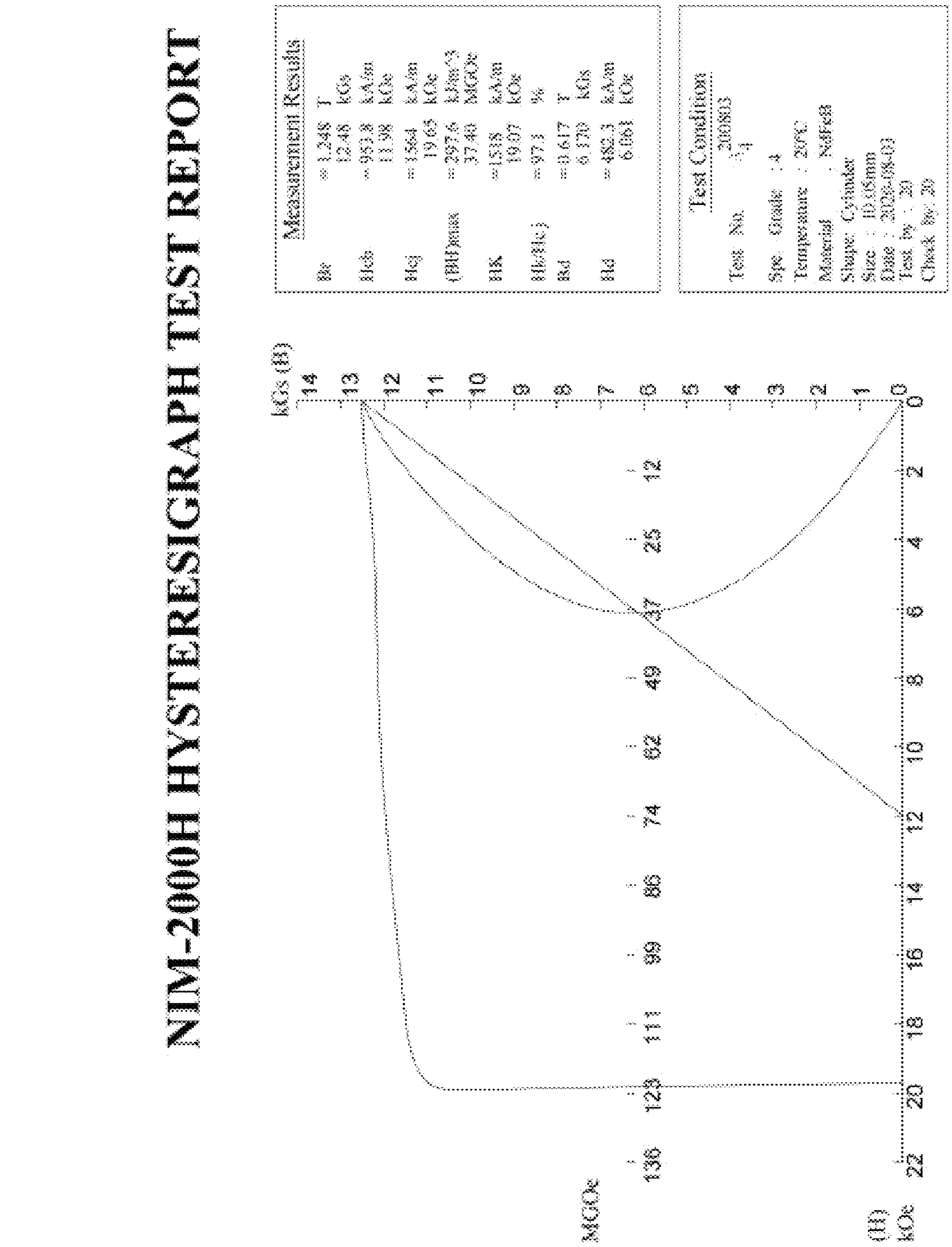
FIG. 3 is a test diagram of the magnetic properties of the sintered neodymium-iron-boron magnet prepared in Example 4.
Figure 4:
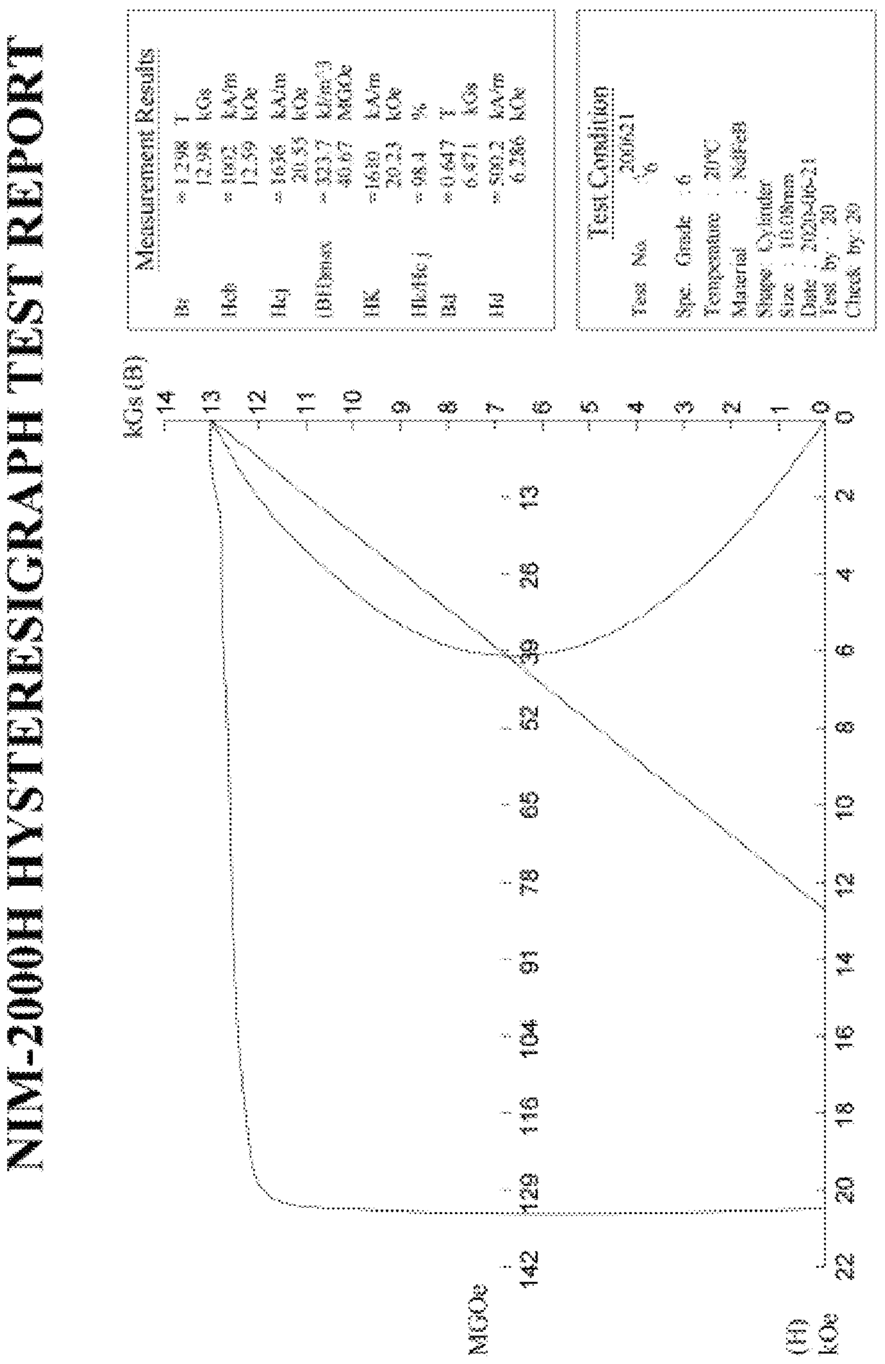
FIG. 4 is a test diagram of the magnetic properties of the sintered neodymium-iron-boron magnet prepared in Example 6.

The comparison of the magnetic properties of the sintered neodymium-iron-boron magnets prepared in Examples 2, 4, 6 and the prior art (i.e. the preparation method described in the background art) is shown in the table below and FIGS. 1-4.

| | Remanence Br/kGs | Intrinsic coercivity Hcj/koe |
|---|---|---|
| Prior art | 13.03 | 20.77 |
| Example 2 | 12.81 | 17.55 |
| Example 4 | 12.48 | 19.65 |
| Example 6 | 12.98 | 20.55 |

The test method is based on GB/T 13560-2017, "Sintered neodymium iron boron permanent magnets".

From the data in the above table, it can be seen that the magnetic properties of the sintered neodymium-iron-boron magnet prepared by the formulation and preparation method of the present disclosure is comparable to that of the sintered neodymium-iron-boron magnet prepared in the prior art, while the amount of the rare earth is greatly reduced, thereby reducing the cost of raw materials, and meanwhile saving a lot of rare earth resources.

The above are only the preferred embodiments of the present disclosure and are not intended to limit the present disclosure. Any modification, equivalent replacement, improvement, etc. made within the spirit and principle of the present disclosure shall be included in the protection scope of the present disclosure.

What is claimed is:

1. A sintered neodymium-iron-boron magnet, which is prepared from raw materials comprising the following components, in mass percentage: 18.5%-40% of an iron powder or a steel powder with a magnetic induction intensity of more than 1.2 T, 4%-10% of a praseodymium-neodymium metal hydride powder, and a remainder of a neodymium-iron-boron powder with a particle size of 1-10 microns, wherein the mass percentages of the above raw materials add up to 100%.

2. The sintered neodymium-iron-boron magnet according to claim 1, wherein the steel powder is a low carbon steel powder or a silicon steel powder or a combination of both; and a particle size of the iron powder or the steel powder is in a range of 1-10 microns.

3. The sintered neodymium-iron-boron magnet according to claim 1, wherein the praseodymium-neodymium metal hydride powder is prepared as follows:

(1) adding a praseodymium-neodymium metal in a rotary hydrogen decrepitation furnace, and after pumping to a vacuum degree of less than 2 Pa, passing hydrogen gas with a purity of more than 99.99% for decrepitation and hydrogenation to form a praseodymium-neodymium hydride; and (2) milling the praseodymium-neodymium hydride into 1-10 microns by jet milling to obtain the praseodymium-neodymium metal hydride powder.

4. The sintered neodymium-iron-boron magnet according to claim 1, wherein the neodymium-iron-boron fine powder is prepared as follows:

(1) weighing the following raw materials in parts by mass: 29-33 parts of a rare earth metal RE, 1-3 parts of an additive metal M, 0.9-1 part of B and 63-69.1 parts of Fe;

(2) melting the weighed raw materials in a smelting furnace at 1400-1600° C., then refining for 5 min, and casting and cooling to form a neodymium-iron-boron alloy with a thickness of 1-5 mm; and (3) adding the neodymium-iron-boron alloy in a rotary hydrogen decrepitation furnace, and after pumping to a vacuum degree of less than 2 Pa, passing hydrogen gas with a purity of more than 99.99% for decrepitation to obtain a powder; subsequently, milling the powder into 1-10 microns by jet milling to obtain the neodymium-iron-boron fine powder.

5. The sintered neodymium-iron-boron magnet according to claim 4, wherein the additive metal M is any one of Co, Cu, Al, Ga, Nb or Zr or a combination thereof.

6. A method for preparing a sintered neodymium-iron-boron magnet, comprising:

step 1: weighing the following raw materials in mass percentage: 18.5%-40% of an iron powder or a steel powder with a magnetic induction intensity of more than 1.2 T, 4%-10% of a praseodymium-neodymium metal hydride powder, and a remainder of a neodymium-iron-boron powder with a particle size of 1-10 microns, wherein the mass percentages of the above raw materials add up to 100%; and step 2: mixing the weighed raw materials uniformly, and subjecting to magnetic field-press molding, isostatic pressing, sintering and tempering to obtain the sintered neodymium-iron-boron magnet.

7. The method according to claim 6, wherein the steel powder is a low carbon steel powder or a silicon steel powder or a combination of both; and a particle size of the iron powder or the steel powder is in a range of 1-10 microns.

8. The method according to claim 6, wherein the praseodymium-neodymium metal hydride powder is prepared as follows:

(1) adding a praseodymium-neodymium metal in a rotary hydrogen decrepitation furnace, and after pumping to a vacuum degree of less than 2 Pa, passing hydrogen gas with a purity of more than 99.99% for decrepitation and hydrogenation to form a praseodymium-neodymium hydride; and (2) milling the praseodymium-neodymium hydride into 1-10 microns by jet milling to obtain the praseodymium-neodymium metal hydride powder.

9. The method according to claim 6, wherein the neodymium-iron-boron fine powder is prepared as follows:

(1) weighing the following raw materials in parts by mass: 29-33 parts of a rare earth metal RE, 1-3 parts of an additive metal M, 0.9-1 part of B and 63-69.1 parts of Fe;

(2) melting the weighed raw materials in a smelting furnace at 1400-1600° C., then refining for 5 min, and casting and cooling to form a neodymium-iron-boron alloy with a thickness of 1-5 mm; and (3) adding the neodymium-iron-boron alloy in a rotary hydrogen decrepitation furnace, and after pumping to a vacuum degree of less than 2 Pa, passing hydrogen gas with a purity of more than 99.99% for decrepitation to obtain a powder; subsequently, milling the powder into 1-10 microns by jet milling to obtain the neodymium-iron-boron fine powder.

10. The method according to claim 9, wherein the additive metal M is any one of Co, Cu, Al, Ga, Nb or Zr or a combination thereof.

* * * * *